United States Patent
Ku

(10) Patent No.: US 9,341,808 B2
(45) Date of Patent: May 17, 2016

(54) VOICE COIL MOTOR AND LENS MODULE

(71) Applicant: HON HAI PRECISION INDUSTRY CO., LTD., New Taipei (TW)

(72) Inventor: Ping-Han Ku, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 246 days.

(21) Appl. No.: 14/067,958

(22) Filed: Oct. 31, 2013

(65) Prior Publication Data

US 2014/0355143 A1    Dec. 4, 2014

(30) Foreign Application Priority Data

May 30, 2013  (TW) .............................. 102119125 A

(51) Int. Cl.
```
G02B 7/02      (2006.01)
H02K 41/03     (2006.01)
G02B 7/04      (2006.01)
H02K 41/035    (2006.01)
```

(52) U.S. Cl.
CPC .............. *G02B 7/04* (2013.01); *H02K 41/0356* (2013.01)

(58) Field of Classification Search
USPC ................. 359/811, 813, 815, 819–824, 826; 310/12.16, 12.21, 12.24
See application file for complete search history.

(56) References Cited

U.S. PATENT DOCUMENTS

2010/0020422 A1*  1/2010  Liao .................... H02K 41/0356
                                                  359/822
2013/0170052 A1*  7/2013  Yu ......................... G02B 27/646
                                                  359/813

* cited by examiner

*Primary Examiner* — Joseph P Martinez
*Assistant Examiner* — Brandi Thomas
(74) *Attorney, Agent, or Firm* — Novak Druce Connolly Bove + Quigg LLP

(57) ABSTRACT

A voice coil motor (VCM) includes a fastening portion, a moving portion, a magnet assembly, a coil, an elastic sheet, and glue. The lower plate seals the fastening portion. The lower plate includes a first surface and a second surface opposite to the first surface, the lower plate defines a through hole penetrating the first surface and the second surface, the low plate defines a first glue recess around the through hole and a second glue recess along an edge of the low plate in the first surface. The fastening portion is positioned on the first surface of the lower plate via glue received in the first glue recess.

20 Claims, 5 Drawing Sheets

VOICE COIL MOTOR AND LENS MODULE

BACKGROUND

1. Technical Field

The present disclosure relates to voice coil motors (VCMs) and, particularly, to a VCM avoiding glue from overflowing and a lens module using the VCM.

2. Description of Related Art

VCMs are used in lens modules for driving the lens barrels to move to focus the lens modules. The VCM generally includes a fastening portion, a moving portion, an elastic sheet, and a lower plate. The elastic sheet is connected between the moving portion and the fastening portion. The moving portion and the elastic sheet are received between the fastening portion and the lower plate. The fastening portion is fastened to the lower plate. If glue adhered between the fastening portion and the lower plate overflows via a through hole of the lower plate, the glue may be adhered on an optical element positioned below the lower plate.

Therefore, it is desirable to provide a VCM that can overcome the limitations described.

DETAILED DESCRIPTION

Embodiments of the disclosure will now be described in detail, with reference to the accompanying drawings.

Figure 1:
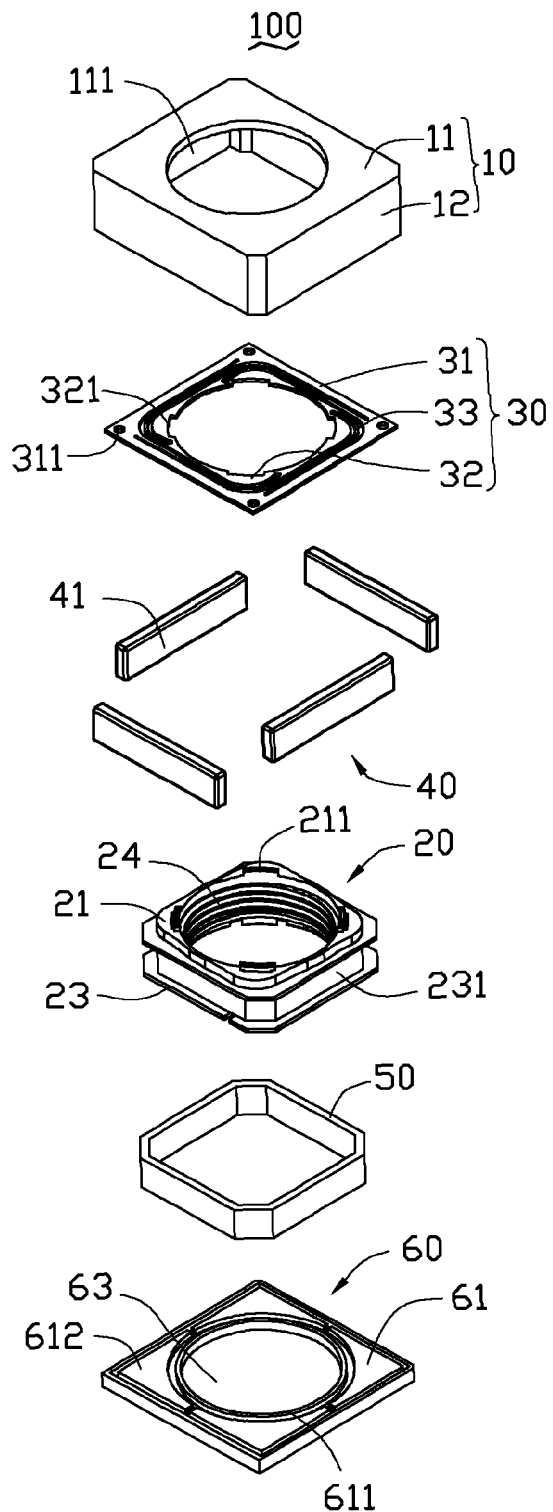
FIG. 1 is an isometric, exploded, and schematic view of a VCM in accordance with an exemplary embodiment.
Figure 2:
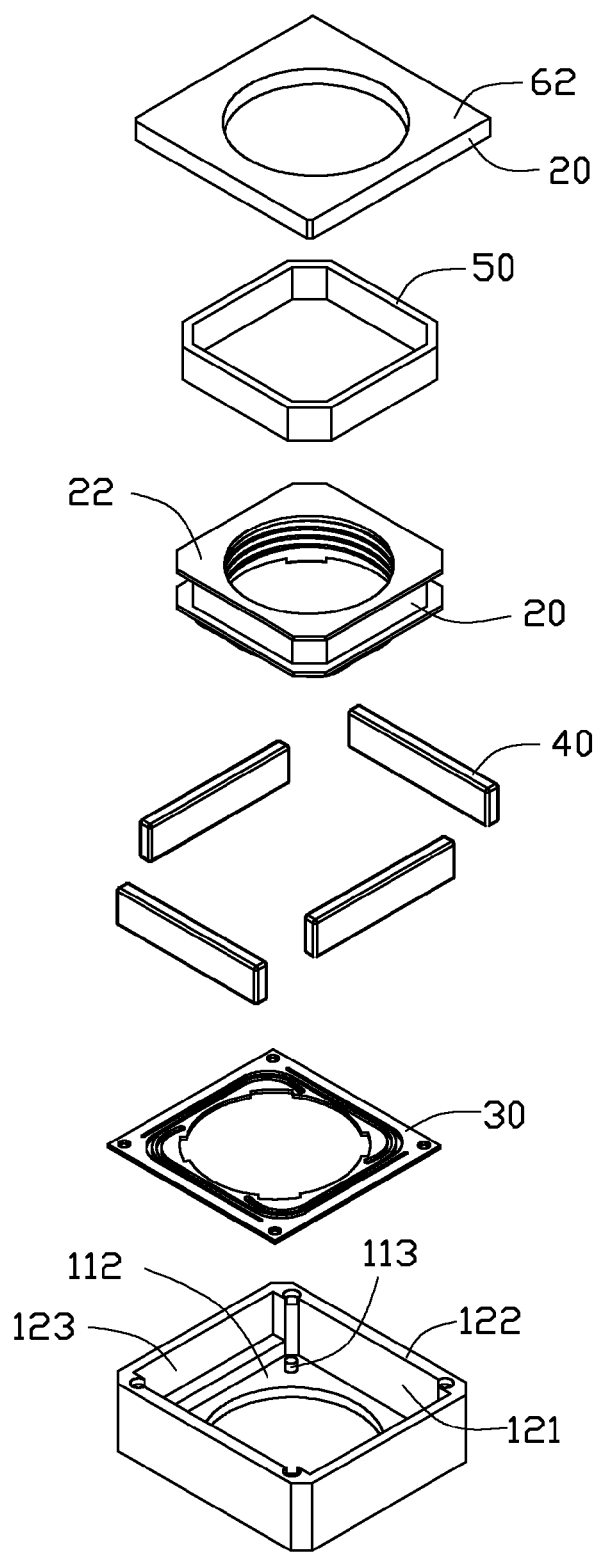
FIG. 2 is similar to FIG. 1, but viewed from another angle.

FIGS. 1-2 show a voice coil motor (VCM) 100, according to an exemplary embodiment. The VCM 100 includes a fastening portion 10, a moving portion 20, an elastic sheet 30, a magnet assembly 40, a coil 50, a lower plate 60, and glue 70.

The fastening portion 10 is substantially a cubic configuration, and includes an upper plate 11 and a sidewall 12 perpendicularly extending from peripheral edges of the upper plate 11. The upper plate 11 is rectangular, and defines a first through hole 111, substantially at a central portion of the upper plate 11. The upper plate 11 includes a lower surface 112. A number of first connecting portions 113 extend from corners of the lower surface 112. The sidewall 120 includes an inner surface 121 and a connecting surface 122 facing away the upper plate 11. A number of first receiving recesses 123 are defined in the inner surface 121.

In the embodiment, the number of the first connecting portions 113 and the first receiving recesses 123 are four. An extending direction of two opposite first receiving recesses 123 is substantially perpendicular to an extending direction of another two opposite first receiving recesses 123.

The moving portion 20 is substantially a cubic configuration, and includes a top surface 21, a bottom surface 22, and an outer surface 23 connected between the top surface 21 and the bottom surface 22. The moving portion 20 defines a screw hole 24 penetrating the top surface 21 and the bottom surface 22, substantially at a central portion of the moving portion 20. A number of second connecting portions 211 extend from the top surface 21. The moving portion 20 defines a second receiving recess 231 in the outer surface 23, and the second receiving recess 231 surrounds the outer surface 23.

In this embodiment, the number of the second connecting portions 211 is four. An inner surface of each second connecting portion 211 and an inner surface of the screw hole 24 are coplanar with each other.

The elastic sheet 30 can be formed by punching and is made of steel. The elastic sheet 30 is square-shaped and includes an outer portion 31, an inner portion 32, and a connection portion 33 connected between the outer portion 31 and the inner portion 32. The outer portion 31 defines a number of first fixing holes 311, substantially at corners thereof. The inner portion 32 defines a number of second fixing holes 321. In this embodiment, the number of the first fixing holes 311 and the second fixing holes 321 respectively are four.

The magnet assembly 40 includes a number of magnets 41. Each magnet 41 is plate shaped, and respectively received in the first receiving recesses 123. In the embodiment, each magnet 41 is a permanent magnet, and the number of the magnets 41 is four.

The coil 50 is circled around the moving portion 20 and received in the second receiving recess 231. The coil 50 is electrically connected to a power source. The coil 50 generates a magnetic field when powered.

The lower plate 60 is substantially square-shaped, and includes a first surface 61 and a second surface 62 opposite to the first surface 61. The lower plate 60 defines a through hole 62 penetrating the first surface 61 and the second surface 62, substantially at a central portion of the lower plate 60. The low plate 60 defines a first glue recess 611 along the through hole 62 and a second glue recess 612 along an edge of the low plate 60 in the first surface 61. The first glue recess 611 is surrounded by the second glue recess 612. The first glue recess 611 communicates with the second glue recess 612.

In the embodiment, the first glue recess 611 is circular, and is adjacent to the through hole 62. The second glue recess 612 is rectangular, and is adjacent to the edge of the low plate 60. A thickness of the sidewall 12 is greater than a wideness of the first glue recess 611.

Figure 3:
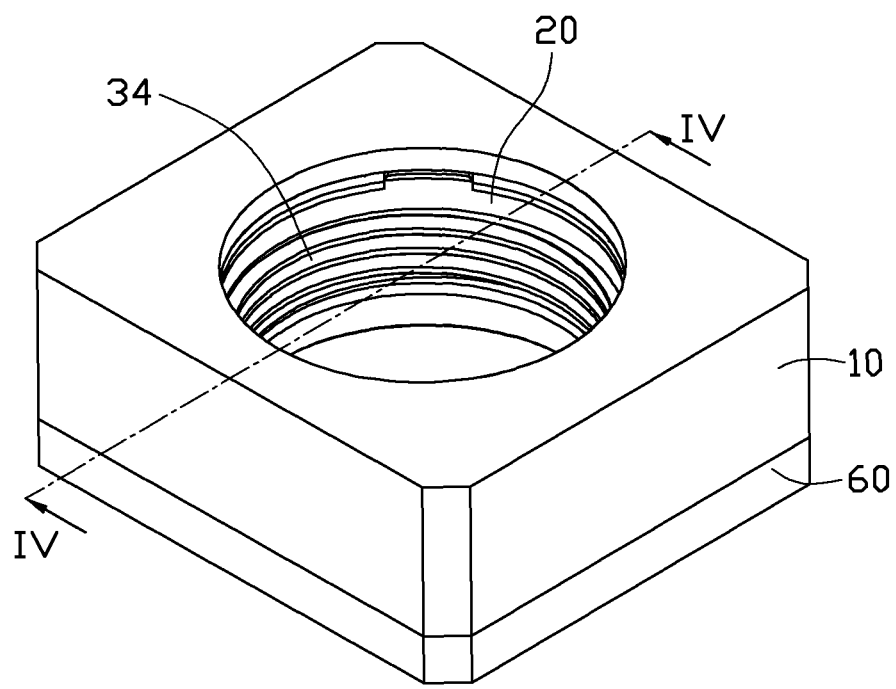
FIG. 3 is an assembled view of the VCM of FIG. 1.
Figure 4:
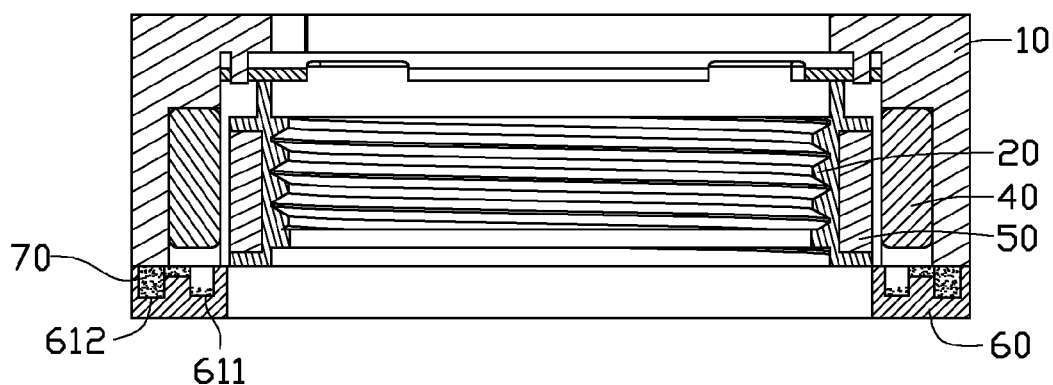
FIG. 4 is a cross-sectional view taken along a line IV-IV of FIG. 3.

FIGS. 3-4 show that in assembly, the elastic sheet 30 is interconnected with the fastening portion 10 and the moving portion 20. The first connecting portions 113 of the upper plate 11 are respectively received in the first fixing holes 311 of the elastic sheet 30, and the second connecting portions 212 of the moving portion 20 are respectively received in the second fixing holes 321 of the elastic sheet 30. The moving portion 20 is received in the fastening portion 10, and the coil 50 is opposite to the magnet assembly 40. The sidewall 12 of the fastening portion 10 is positioned on the lower plate 60, and the fastening portion 10 is sealed by the sidewall 12. The connecting surface 122 is connected to the first surface 61 via the glue 70 received in the first glue recess 611. The glue 70 overflowing from the first glue recess 611 will flow into the second glue recess 612.

In operation, the coil 50 circling the moving portion 20 is powered, the coil 60 generates a magnet field. The moving portion 20 is driven to move along the optical axis by a magnetic force between the coil 60 and the magnet assembly 40 fixed on the fastening portion 10.

Figure 5:
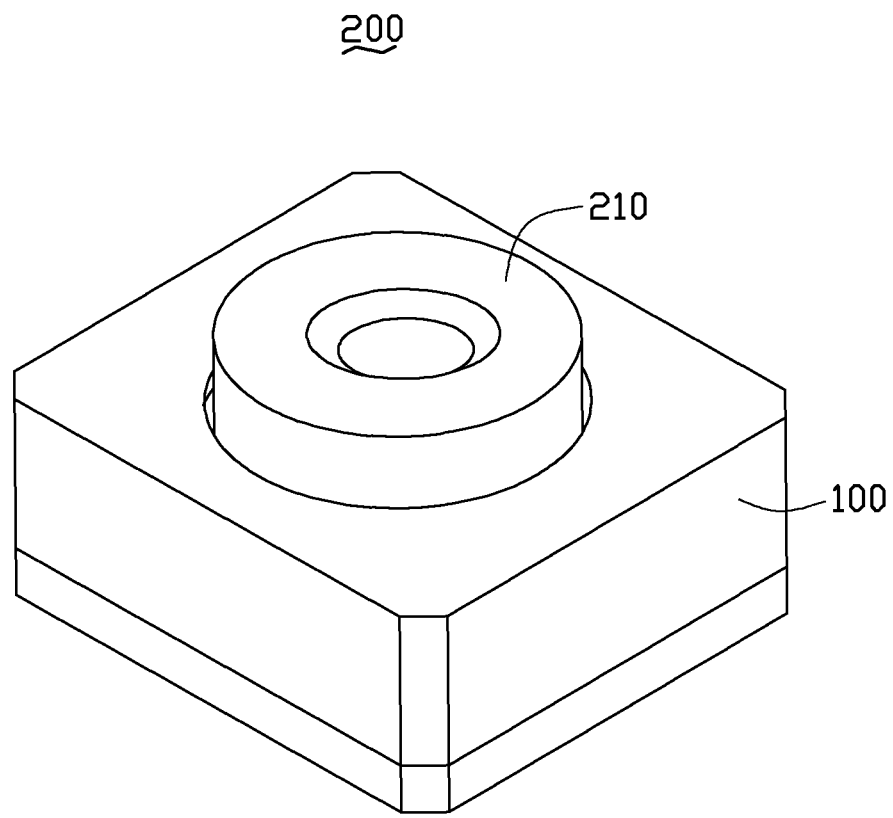
FIG. 5 is an assembled view of a lens module using the VCM of FIGS. 1-4.

Referring to FIG. 5, a lens module 200, according to an exemplary embodiment, includes the VCM 100 and a lens module 210. The lens module 210 is screwed in the screw hole 24 of the moving portion 20.

Particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A voice coil motor (VCM), comprising:
a fastening portion;
a moving portion received in the fastening portion;
a magnet assembly fixed on an inner surface of the fastening portion;
a coil circled around an outer surface of the moving portion and opposite to the magnet assembly;
an elastic sheet connected between the fastening portion and the moving portion; and
a lower plate sealing the fastening portion;
wherein the lower plate comprises a first surface and a second surface opposite to the first surface, the lower plate defines a through hole penetrating the first surface and the second surface, the lower plate defines a first glue recess around the through hole and a second glue recess along an edge of the low plate in the first surface, the first glue recess communicates with the second glue recess; the fastening portion is positioned on the first surface of the lower plate via glue received in the first glue recess.

2. The VCM of claim 1, wherein the first glue recess is surrounded by the second glue recess.

3. The VCM of claim 1, wherein the fastening portion comprises an upper plate and a sidewall perpendicularly extending from peripheral edges of the upper plate, the upper plate comprises a lower surface and a plurality of first connecting portions extending from corners of the lower surface.

4. The VCM of claim 3, wherein the moving portion comprises a top surface, a bottom surface, and an outer surface connected between the top surface and the bottom surface, the moving portion comprises a plurality of second connecting portions extending from the top surface.

5. The VCM of claim 4, wherein the elastic sheet comprises an outer portion, an inner portion, and a connection portion connected between the outer portion and the inner portion, the outer portion is connected to the upper plate, and the inner portion is connected to the moving portion.

6. The VCM of claim 5, wherein the outer portion defines a plurality of first fixing holes, the inner portions define a plurality of second fixing holes, the first connecting portions are respectively received in the first fixing holes, the second connecting portions are respectively received in the second fixing holes.

7. The VCM of claim 3, wherein a thickness of the sidewall is greater than a wideness of the first glue recess.

8. The VCM of claim 3, wherein the sidewall comprises an inner surface and a plurality of first receiving recesses defined in the inner surface; the magnet assembly comprises a plurality of magnets, the magnet are respectively received in the first receiving recesses.

9. The VCM of claim 8, wherein the moving portion defines a second receiving recess in the outer surface, and the second receiving recess surrounds the outer surface; the coil is circled around the moving portion and received in the second receiving recess.

10. A lens module, comprising:
a voice coil motor (VCM), comprising:
a fastening portion;
a moving portion received in the fastening portion;
a magnet assembly fixed on an inner surface of the fastening portion;
a coil circled around an outer surface of the moving portion and opposite to the magnet assembly;
an elastic sheet connected between the fastening portion and the moving portion; and
a lower plate sealing the fastening portion;
wherein the lower plate comprises a first surface and a second surface opposite to the first surface, the lower plate defines a through hole penetrating the first surface and the second surface, the lower plate defines a first glue recess around the through hole and a second glue recess along an edge of the low plate in the first surface, the first glue recess communicates with the second glue recess; the fastening portion is positioned on the first surface of the lower plate via glue received in the first glue recess;
a lens module received in the moving portion.

11. The VCM of claim 1, wherein the coil is surrounded by the magnet assembly.

12. The VCM of claim 11, wherein the coil is spaced from the magnet assembly.

13. The VCM of claim 8, wherein each of the first receiving recesses of the sidewall defines a step coupled to a corresponding magnet.

14. The VCM of claim 13, wherein the step is parallel to the lower surface of the upper plate of the fastening portion.

15. The lens module of claim 10, wherein the coil is surrounded by the magnet assembly.

16. The lens module of claim 15, wherein the coil is spaced from the magnet assembly.

17. The lens module of claim 10, wherein the fastening portion comprises an upper plate and a sidewall extending from the upper plate, the sidewall defining a plurality of first receiving recesses receiving the magnet assembly, each of the first receiving recesses defining a step coupled to the magnet assembly.

18. The lens module of claim 17, wherein the step is parallel to the upper plate.

19. The lens module of claim 10, wherein the first glue recess is surrounded by the second glue recess.

20. The lens module of claim 19, wherein the first glue recess is continuously around the through hole.

* * * * *